(12) United States Patent
Huang et al.

(10) Patent No.: US 11,071,051 B1
(45) Date of Patent: Jul. 20, 2021

(54) SYSTEMS AND METHODS FOR SCEF-ASSISTED MEC TRAFFIC BREAKOUT

(71) Applicant: Verizon Patent and Licensing Inc., Washington, DC (US)

(72) Inventors: Ye Huang, San Ramon, CA (US); Miguel A. Carames, Long Valley, NJ (US); Alexander Fadeev, Summit, NJ (US); Parry Cornell Booker, Arlington, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/816,514

(22) Filed: Mar. 12, 2020

(51) Int. Cl.
*H04W 28/10* (2009.01)
*H04W 48/16* (2009.01)
(Continued)

(52) U.S. Cl.
CPC ............. *H04W 48/16* (2013.01); *H04W 8/08* (2013.01); *H04W 8/245* (2013.01); *H04W 28/10* (2013.01); *H04W 80/10* (2013.01); *H04W 88/16* (2013.01)

(58) Field of Classification Search
CPC . H04W 4/029; H04W 28/0268; H04W 24/02; H04W 48/18; H04W 88/18; H04W 4/02; H04W 64/003; H04W 8/02; H04W 8/18; H04W 28/02; H04W 28/0215; H04W 28/0226; H04W 28/10; H04W 40/20; H04W 48/17; H04W 4/00; H04W 4/021; H04W 4/025; H04W 64/00; H04W 88/16; H04W 88/182; H04W 8/06; H04W 8/22; H04W 48/16; H04W 8/245; H04W 8/08; H04W 80/10; H04L 67/10; H04L 67/141; H04L 41/0816; H04L 43/08; H04L 47/24; H04L 47/2475; H04L 47/62; H04L 47/762; H04L 61/103; H04L 61/1511; H04L 61/1541; H04L 61/6022
See application file for complete search history.

(56) References Cited

U.S. PATENT DOCUMENTS

| 2010/0195621 A1* | 8/2010 | Kekki | H04W 48/17 370/332 |
| 2011/0286384 A1* | 11/2011 | Sugimoto | H04W 80/04 370/328 |

(Continued)

OTHER PUBLICATIONS

3GPP TS 23.682 V16.5.0, dated Dec. 2019, p. 57-88 (Year: 2019).*

(Continued)

*Primary Examiner* — Daniel Lai (57) ABSTRACT

Systems and methods provide a Multi-access Edge Computing (MEC) traffic breakout service to access an edge network. A network device receives reachability information for a user equipment (UE) device and sends, in response to receiving the reachability information, a reachability notification to a MEC orchestrator for the edge network. The network device receives, from the MEC orchestrator, a local breakout request that identifies a traffic flow authorized to receive local service from the edge network. The network device generates instructions for a gateway device to apply local breakout service, for the traffic flow, to a local MEC application in the edge network and sends the instructions to an anchoring gateway device for the traffic flow.

20 Claims, 7 Drawing Sheets

(51) Int. Cl.
*H04W 8/24* (2009.01)
*H04W 8/08* (2009.01)
*H04W 88/16* (2009.01)
*H04W 80/10* (2009.01)

(56) References Cited

U.S. PATENT DOCUMENTS

| 2016/0286385 | A1* | 9/2016 | Ryu | H04W 76/28 |
| 2018/0041954 | A1* | 2/2018 | Tamura | H04M 15/80 |
| 2019/0098490 | A1* | 3/2019 | Jin | H04L 63/0876 |
| 2020/0120446 | A1* | 4/2020 | Stammers | H04L 67/1021 |
| 2021/0014733 | A1* | 1/2021 | Soliman | H04W 28/0942 |
| 2021/0029517 | A1* | 1/2021 | Zhu | H04W 24/10 |

OTHER PUBLICATIONS

"3GPP TSG-RAN WG3 #93 R3-161575" by Intel, dated Aug. 22-26, 2016 (Year: 2016).*
"Local Breakout—A Solid Business Case for MEC at the Edge" by Mavenir, dated May 2018 (Year: 2018).*

* cited by examiner

SYSTEMS AND METHODS FOR SCEF-ASSISTED MEC TRAFFIC BREAKOUT

BACKGROUND

New broadband cellular networks (e.g., 3GPP Fifth Generation (5G) networks) can provide various services and applications to user devices with optimized latency. For example, the use of Multi-access Edge Computing (MEC) platforms (also referred to as Mobile Edge Computing platforms) with 5G networks allows high network computing loads to be transferred onto edge servers, which can minimize latency and reduce backhaul among other things, depending on the network path between the edge servers and the point of attachment (e.g., a wireless station for a user device). Development of MEC resources has primarily been focused toward use of a 5G infrastructure. However, mobile carriers may need to deploy a robust MEC solution for preceding network architectures, such as 3GPP Fourth Generation (4G) Long Term Evolution (LTE) and non-standalone (NSA) 5G networks, until a 5G standalone core is fully realized.

DETAILED DESCRIPTION OF PREFERRED EMBODIMENTS

The following detailed description refers to the accompanying drawings. The same reference numbers in different drawings may identify the same or similar elements.

Local Breakout (LBO) provides a mechanism where roaming traffic is handled as close as possible to the user's location. Current core networks for LTE and non-standalone 5G service, use a static configuration to facilitate LBO to MEC networks. One of the static configurations uses Access Point Names (APNs), where a particular MEC location may be associated with an APN and user equipment (also referred to as a "UE device") may request a connection to a particular MEC network using the APN. However, use of APNs to support LBO to MEC networks presents scalability challenges (e.g., in terms of provisioning, operation and maintenance, etc.).

Systems and methods described herein provide a MEC traffic breakout service. The MEC traffic breakout service may pertain to 4G LTE and non-standalone 5G NR networks. A network device, such as a Service Capability Exposure Function (SCEF), may receive a UE device status, such as location and APN connectivity information. The network device may send, in response to receiving the UE device status, a reachability notification to a MEC device (e.g., a MEC orchestrator). The network device may receive, from the MEC orchestrator, a local breakout request that identifies a traffic flow authorized to receive local service from the edge network. The network device may generate instructions for a gateway device to apply local breakout service, for the traffic flow, to a local MEC application in the edge network and may send the instructions to an anchoring gateway device for the traffic flow. Based on the instructions, a local serving gateway (SGW) may enforce per-traffic flow local breakout for MEC traffic (in contrast, for example, with a static per-APN breakout).

Figure 1:
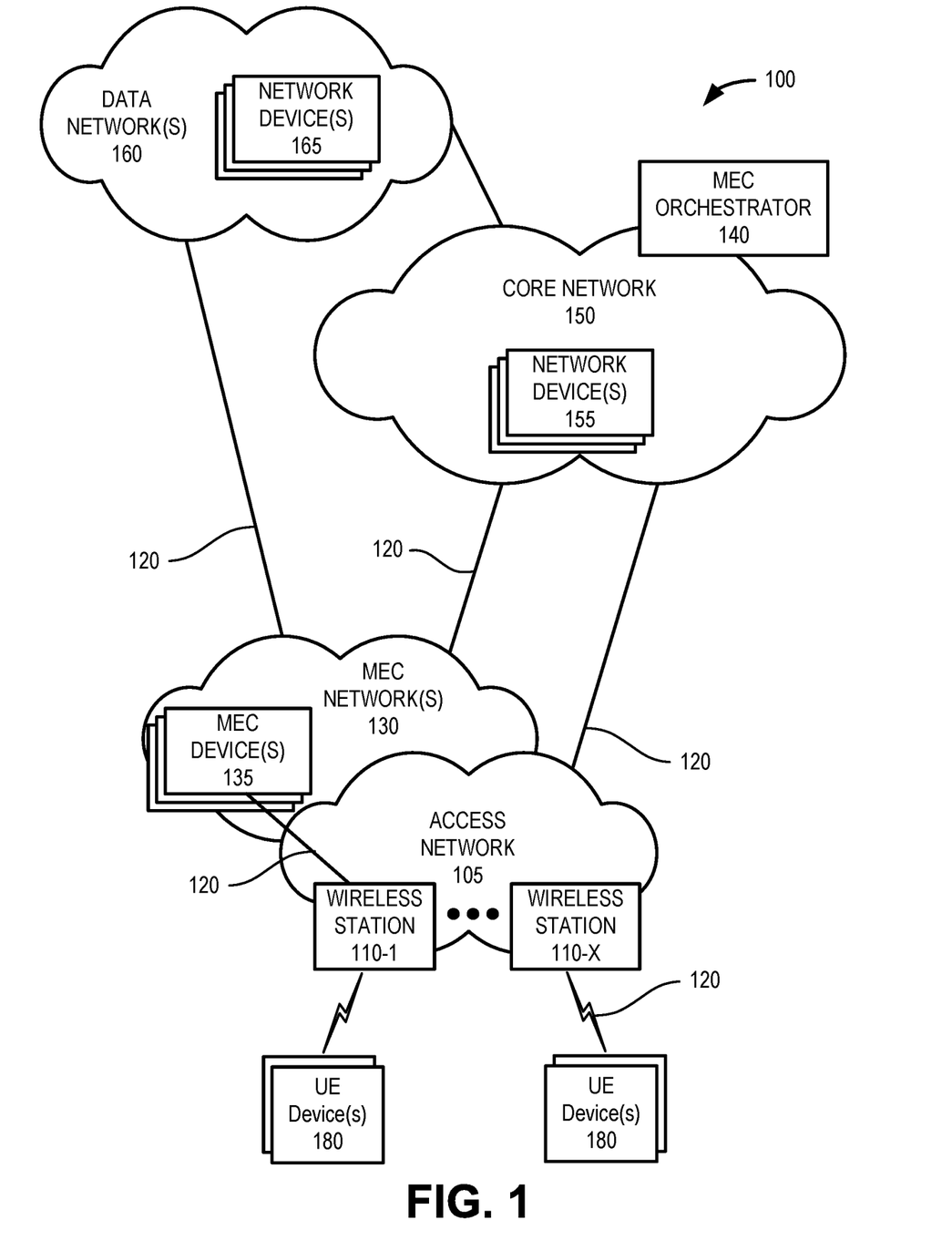
FIG. 1 is a diagram illustrating an exemplary network environment in which a MEC traffic breakout service described herein may be implemented.

FIG. 1 illustrates an exemplary environment 100 in which an embodiment of the MEC traffic breakout service may be implemented. As illustrated, environment 100 includes an access network 105, one or more MEC networks 130, a MEC controller 140, a core network 150, and one or more data networks 160. Access network 105 may include wireless stations 110-1 through 110-X (referred to collectively as wireless stations 110 and generally as wireless station 110). MEC network 130 may include MEC devices 135; core network 150 may include network devices 155; and data networks 160 may include network devices 165. Environment 100 further includes multiple UE devices 180.

The number, the type, and the arrangement of network devices and the number of UE devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, and/or another type of computing architecture.

Environment 100 includes communication links 120 between the networks, between the network devices, and between UE devices 180 and the network devices. Environment 100 may be implemented to include wired, optical, and/or wireless communication links among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 105 may be implemented according to various wireless technologies (e.g., radio access technology (RAT), etc.), wireless standards, wireless frequencies/bands, and so forth. According to an implementation, wireless stations 110 may include both eNBs and gNBs. In some implementations, wireless stations 110 may no support separate control plane and user plane signaling. In other implementations, access network may support separate control plane and user plane signaling. For example, a gNB may include multiple decomposed distributed components, such as a central unit (CU) with separate control plane and user plane functionality, a distributed unit (DU), a remote unit (RU or a remote radio unit (RRU)), or another type of distributed arrangement.

MEC network 130 (also referred to as an "application service layer network" or "edge network") may include a platform that provides application services, such as low latency services, at the edge of a network. For purposes of illustration and description, MEC devices 135 may include various types of network devices that may be resident in MEC network 130. MEC devices 135 may include variable compute configurations, including, without limitation, a central processing unit (CPU), a graphical processing unit (GPU), a field programmable gate array (FPGA), etc. MEC devices 135 may also include devices to perform orchestration and containerization functions. MEC devices 135 may be located to provide geographic proximity to various groups of wireless stations 110. In some embodiments, MEC devices 135 may be co-located with a wireless station 110 or with a component of a wireless station (e.g., a control unit of a gNB). In other embodiments, wireless stations 110 may connect to MEC network 130 via wired (e.g., optical) backhaul links 120.

MEC network 130 may be implemented using one or multiple technologies including, for example, network function virtualization (NFV), software defined networking (SDN), cloud computing, webscale, or another type of network technology. Depending on the implementation, MEC network 130 may include, for example, virtualized network functions (VNFs), containerized network functions (CNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

MEC orchestrator 140 includes a network device to manage and control use of MEC network 130. MEC orchestrator 140 may include logic that provides MEC selection and orchestration among MEC networks 130 and/or MEC devices 135. MEC orchestrator 140 may, for example, maintain a topology map of MEC deployments. According to an implementation, MEC orchestrator 140 may be a centralized component for MEC network 130. For example, MEC orchestrator 140 may be co-located with one or more network devices 155 of core network 150. In another implementation, MEC orchestrator 140 may be located in a local MEC network 130 location or data network 160. MEC orchestrator 140 may monitor network loads, manage capacity, and select a MEC device 135 that satisfies a performance metric requirement and a capability requirement for a MEC service requested by UE device 180.

Core network 150 may include one or multiple networks of one or multiple network types and technologies. For example, core network 150 may be implemented to include an Evolved Packet Core (EPC) of an LTE network, an LTE-A network, an LTE-A Pro network, a Next Generation Core (NGC), a 5G Core Network (5GC) for a 5G network and/or a legacy core network. According to one implementation, core network 150 may include a non-standalone (NSA) core network to support dual coverage using 4G and 5G networks, referred to as interoperability Option 3x, or other 3GPP defined NSA-based architecture options. Core network 150 may manage communication sessions for UE devices 180. For example, core network 150 may establish an Internet Protocol (IP) connection between a UE device 180 and a MEC device 135 in a particular MEC network 130 location. Furthermore, core network 150 may enable UE device 180 to communicate with an application server or another type of network device 165 located in a particular data network 160.

Depending on the implementation, core network 150 may include various network elements that may be implemented in network devices 155. Such network elements may include a mobility and management entity (MME), a user plane function (UPF), a session management function (SMF), a core access and mobility management function (AMF), a unified data management (UDM), a PDN gateway (PGW), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices, core network 130 may include one or more network devices 155 with combined 4G and 5G functionality, such as a session management function with PDN gateway-control plane (SMF+PGW-C) and a user plane function with PDN gateway-user plane (UPF+PGW-U).

Data network 160 may include one or multiple networks. For example, data network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices 165 that provide various applications, services, or other type of user device assets (e.g., servers (e.g., web, application, cloud, etc.), mass storage devices, data center devices), and/or other types of network services pertaining to various network-related functions.

UE devices 180 may each include a mobile device, such as wireless or cellular telephone device (e.g., a conventional cell phone with data processing capabilities), a smart phone, a personal digital assistant (PDA) that can include a radiotelephone, etc. In other implementations, UE devices 180 may be implemented as a machine-type communications (MTC) device, an Internet of Things (IoT) device, a machine-to-machine (M2M) device, etc., that includes communication functionality, such as a home appliance device, a home monitoring device, a surveillance camera, a medical monitoring device, etc. In another implementation, UE device 180 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. As described further herein, UE devices 180 or applications running on UE devices 180 may be configured for certain types of communications in network environment 100. For example, UE device 180 may be associated with an identifier such as PLMN-ID or network slice selection assistance information (NSSAI) that governs particular types of network traffic, such as traffic designated for MEC-based services.

Figure 2A:
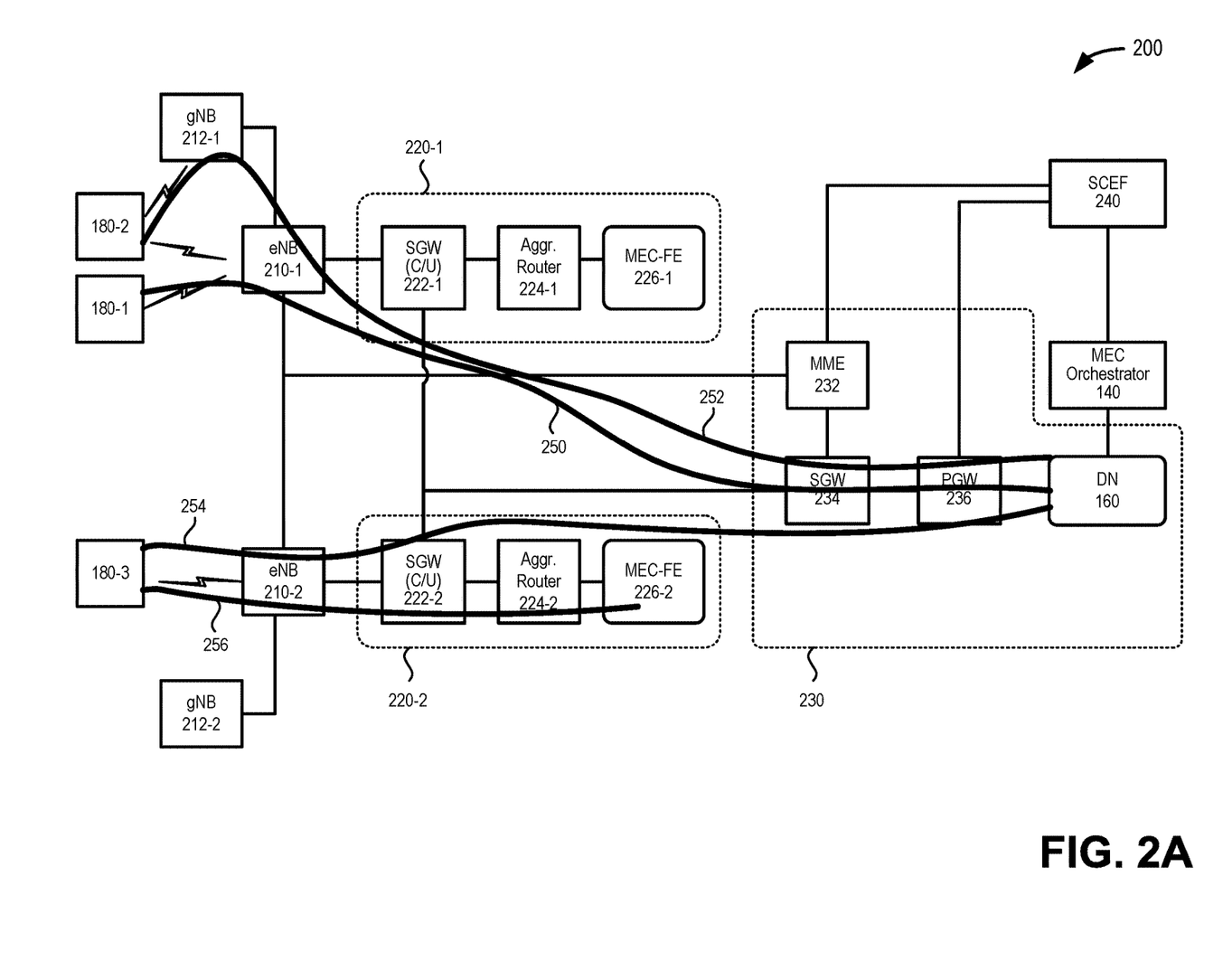
FIGS. 2A and 2B are block diagrams illustrating exemplary network components in a portion of network environment of FIG. 1, according to an implementation.
Figure 2B:
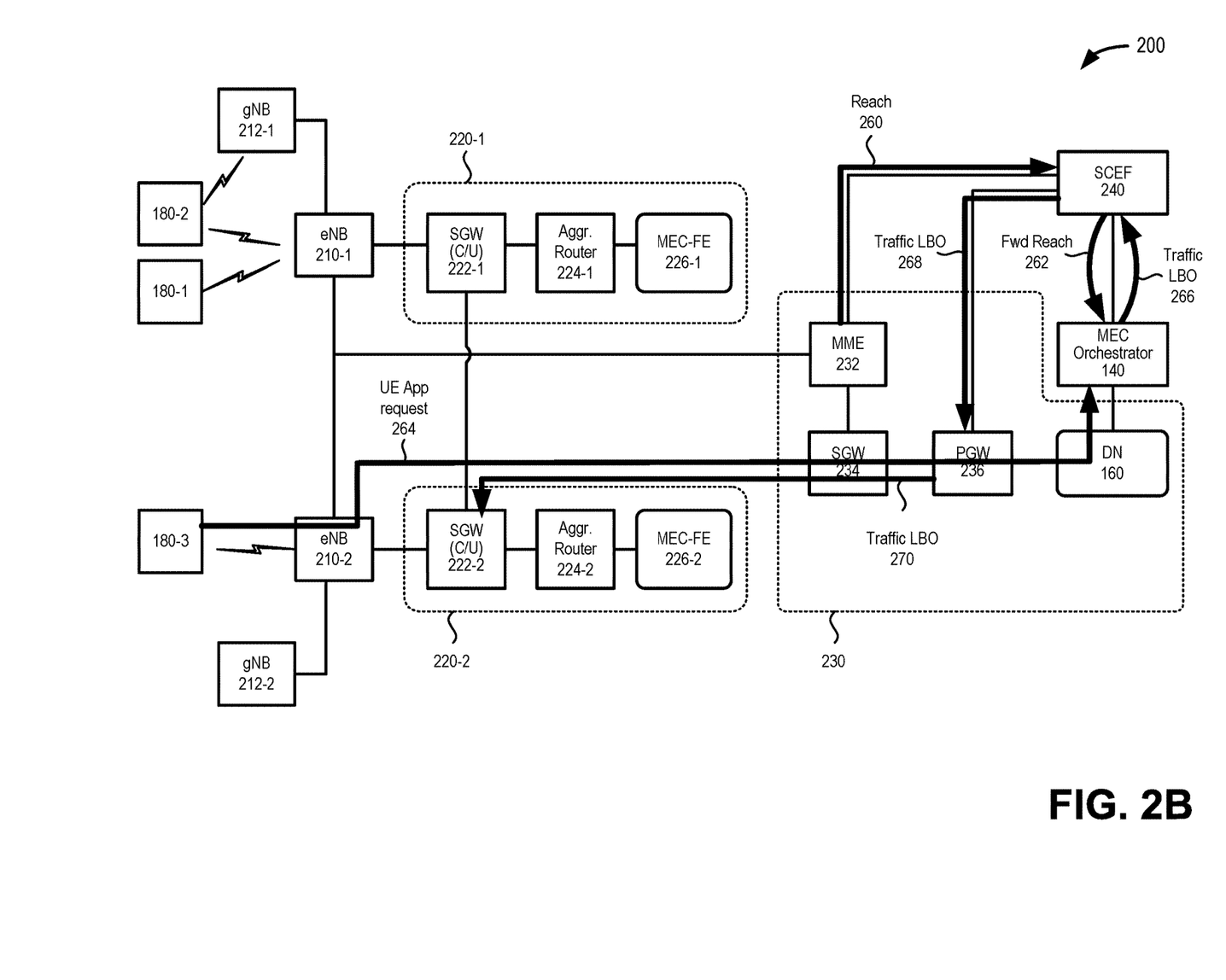

FIGS. 2A and 2B are block diagrams illustrating exemplary network components in a portion 200 of network environment of FIG. 1. More particularly, FIGS. 2A and 2B represent the MEC traffic breakout service with SCEF-controlled LBO at a Transport Aggregation Point (TAP) for MEC traffic in an Option 3X-enabled network without control/user plane separation.

Referring collectively to FIGS. 2A and 2B, network portion 200 may include evolved Node Bs (eNB) 210-1 and 210-2; next generation Node Bs (gNB) 212-1 and 212-2; TAPs 220-1 and 220-2; a Service Aggregation Point (SAP) 230; SCEF 240; MEC orchestrator 140; data network (DN) 160; and UE devices 180-1 and 180-2.

Each of eNBs 210-1 and 210-2 and gNBs 212-1 and 212-2 may correspond to a wireless station 110. Each eNB 210 may include functionality that allows UE device 180 to wirelessly connect to access network 105 and core network 150 via 4G LTE standards. Each gNB 212 may include a New Radio (NR) Next Generation gNodeB for a 5G mobile network. Each gNB 212 may include a centralized unit (CU), at least one distributed unit (DU), and at least one radio unit (RU) (not shown in FIG. 2A/2B).

TAPs 220-1 and 220-2 (referred to herein collectively as TAPs 220 and generically as TAP 220) may include a group of network devices located at a network edge. TAP 220 may correspond to an edge location within MEC network 130. According to one implementation, a preferred TAP 220 may be the closest edge location to a wireless station being accessed by UE device 180. TAPs 220 may each include a local SGW 222, aggregation router 224, and MEC-FE 226. TAP 220 may be configured to include both user plane functions and control plane functions through which traffic between UE devices 180 and MEC-FE 226 may be routed. Components of TAP220 may, in one implementation, be instantiated in one or more MEC devices 135.

SGW 222 may include local network device that interfaces with wireless stations 110 (e.g., eNB 210) for control plane and/or user plane communications to TAP 220. Aggregation router 224 may route, for example, traffic from UE devices 180 to an appropriate MEC-Far Edge (FE) 226 (e.g., MEC-FE 226-1). MEC-FE 226 may provide application services (e.g., low latency, high reliability services) for applications running on UE devices 180.

SAP 230 may include core components of a wireless network that serves to provide wireless access for a service to subscribing UE devices 180. Components of SAP 230 may be included in core network 150 (e.g., network devices 155) or included in a centralized portion of MEC network 130 (e.g., MEC devices 135). In the configuration of network portion 200, SAP 230 may include an MME 232, an SGW 234, and a PGW 236, which provide for communications between subscribing UE devices 180 and devices (e.g., an application server or another network device, not shown) in data network 160.

MME 232 may include a network device that implements control plane processing for access network 105 and/or core network 150. For example, MME 232 may direct routing for UE device 180, may activate and deactivate bearers for UE device 180, may authenticate a UE device 180, and may interface to non-4G/5G radio access networks. MME 232 may also select a particular SCEF 240 for a particular UE device 180. MME 232 may interface with SCEF 240 via a non-IP APN via a packet data network (PDN) connection.

SGW 234 includes a network device that routes and forwards session data between PGW 236 and an eNB 210 serving the session's destination UE device 180. PGW 236 includes a network device that acts as a router and a gateway between core network 150 and data network 160, and forwards session data received from UE devices 180 to data network 160 for destinations, and forwards session data received from sources in data network 160 to UE devices 180 connected to an eNB 210.

MEC orchestrator 140 may manage MEC selection and orchestration among MEC networks 130 and/or MEC devices 135. MEC orchestrator 140 may maintain topology information and mapping information of MEC deployments at different geographic locations (e.g., different edge locations associated with different wireless stations 110). As described further herein, MEC orchestrator 140 may receive a UE device 180 status from SCEF 240 and select a MEC device 135 or edge location that satisfies a performance requirement (e.g., latency, reliability, throughput, etc.) and a capability requirement for a requested MEC service.

SCEF 240 may include a network device that provides exposure of 3GPP network service capabilities to third party applications. Specifically, SCEF 240 may provide network events through application programming interfaces (APIs) to external applications which may reside on application servers (e.g., in data network 160) and/or UE devices 180. Exposure of the various events may include, for example: UE device 180 reachability; UE device 180 loss of connectivity; UE device 180 location reporting; UE device 180 roaming status; and communication failure. In one implementation, SCEF 240 may exchange control plane signaling with MME 232 (e.g., via a T6a interface using DIAMETER protocol). As described further herein, SCEF 240 may provide dynamic UE device status updates to MEC orchestrator 140 and receive local breakout requests from MEC orchestrator 140 to manage the MEC traffic breakout service in LTE and non-standalone core networks.

UE devices 180-1 may represent UE devices with different capabilities and/or application requirements. UE device 180-1 may include an LTE-enabled device. UE device 180-2 may include an Evolved Universal Terrestrial Radio Access New Radio Dual Connectivity (EN-DC) device.

Referring to FIG. 2A, an example of different traffic flows for network portion 200 is shown. After initial control plane signaling, UE device 180-1 may be connected to data network 160 as illustrated in flow 250. For example, UE device 180-1 may establish a data session with data network 160 via standalone LTE components, namely eNB 210-1, SGW 234, and PGW 236.

Also after initial control plane signaling, UE device 180-2 may be connected to data network 160, as illustrated in flow 252. For example, UE device 180-2 may establish a data session with data network 160 via Option 3x using eNB 210-1 and/or gNB 212-1 with SGW 234, and PGW 236.

After initial communications with MEC orchestrator 140 (not shown), UE device 180-3 may connect to SGW 222-2. UE device 180-3 may have different traffic flows for different application services. For example, a traffic flow (shown as flow 254) that is not supported with MEC services may be directed to data network 160, and another traffic flow (shown as flow 256) that is authorized for MEC service may be directed to MEC-FE 226-2. Flow 254 uses eNB 210-2 and/or gNB 212-2, SGW 222-2, and PGW 236 to access data network 160. Flow 256 uses eNB 210-2 and/or gNB 212-2, SGW 222-2, PGW 236, and aggregation router 224-2 to access MEC FE 226-2.

Thus, in the configuration of FIG. 2A, UE devices 180-1, 180-2, and 180-3 are anchored on PGW 236 in SAP 230, while flow 256 for UE 180-3 uses SGW 222-2 to provide local breakout (LBO) for MEC-based traffic. Control plane signaling to configure flows 254/256 is described in connection with FIG. 2B.

Referring to FIG. 2B, MME 232 may provide a reachability notification (reach) 260 to SCEF 240. For example, SCEF 240 may subscribe to receive attachment and mobility information from MME 232. Based on at attachment signaling with UE device 180 (not shown), in one implementation, MME 232 may provide reachability notification 260 in the form of a reachability report, which delivers a UE device's current reachability and notifies of changes. In another implementation, a mobility event or location update for UE device 180 may trigger MME 232 to provide reachability notification 260 to SCEF 240. According to an implementation, reachability notification 260 may include a UE identifier (ID) for UE device 180, a currently used APN(s), a cell identifier (CID), and an anchor PGW identifier (e.g., for PGW 236). In another implementation, reachability notification 260 may include another representation of UE location information in addition or in place of to the CID, such as a Location Area Code (LAC), Tracking Area Code (TAC), or PLMN-ID. In one implementation, MME 232 may exchange control plane signaling with SCEF 240 via a DIAMETER T6a interface.

SCEF 240 may receive reachability notification 260 and forward a reachability notification 262 to MEC orchestrator 140. According to an implementation, SCEF 240 may receive reachability notification 260 and forward reachability notification 262 in real time or near-real time. Reachability notification 262 may include the UE ID for UE device 180, the current APN, and UE location information based on information from reachability notification 260. According to an implementation, MEC orchestrator 140 may store information from reachability notification 262, along with previously-stored MEC network topology.

MEC orchestrator 140 may receive a UE application request 264 initiated by a UE device 180 (e.g., UE device 180-3). For example, UE application request 264 may be received after or concurrently with reachability notification 262. UE application request 264 may request MEC services, such as video services, gaming services, autonomous vehicle services, etc., for a particular application and may include information to support the request for services. The UE application request 264 may include, for example, a UE ID, application server information (e.g., a fully qualified domain name (FQDN)), and application traffic flow information (e.g., source IP/port, destination IP/port, application identifier, etc.). Upon receiving UE application request 264, MEC orchestrator 140 may confirm that the application (e.g., executing on UE device 180) is authorized to receive MEC services. MEC orchestrator 140 may then use the UE information received from SCEF 240 (e.g., reachability notification 262) and its previously-stored MEC application platform topology information to identify a MEC-FE (e.g., MEC-FE 226-2) that can provide local service responsive to UE application request 264. MEC orchestrator 140 may, thus, invoke a sequence of new commands to initiate a local breakout for the MEC traffic by sending a traffic LBO message 266. Traffic LBO message 266 may include, for example, the UE ID, the traffic flow ID, the APN, an application ID, and a network area identifier (e.g., a Cell ID, a LAC, a TAC, a PLMN-ID, etc.). In one implementation, traffic LBO message 266 may be provided via an IP interface (e.g., using an Application Programming Interface (API)) between MEC orchestrator 140 and SCEF 240.

SCEF 240 may receive traffic LBO message 266 from MEC orchestrator 140 and, in response, may generate and send traffic LBO command 268 to the appropriate PGW (e.g., PGW 236) that is serving as an anchor for UE device 180. Traffic LBO command 268 may include the same UE ID, the traffic flow ID, the APN, and LDN provided in traffic LBO message 266. In one implementation, traffic LBO command 268 may be provided via a DIAMETER or RADIUS interface, such as an SGi interface between SCEF 240 and PGW 236.

PGW 236 may receive traffic LBO command 268 and forward traffic LBO command 268 as traffic LBO command 270 to the appropriate local SGW 222 (e.g., SGW 222-2 in TAPS 220-2). SGW 222-2 may interface with PGW 236 through an S5/S8 interface, which may be implemented, for example, using General Packet Radio Service Tunneling Protocol version 2 (GTPv2).

SGW 222-2 may receive traffic LBO command 270. SGW 222-2 may strip off the tunneling information and, using the information in traffic LBO command 270, may switch the destination IP/port for the MEC-based traffic flow and redirect the flow to MEC-FE 226-2. Thus, network portion 200 may dynamically establish, for a particular session, MEC communications (e.g., flow 256 of FIG. 2A) between UE device 180 and MEC-FE 226-2.

Although FIGS. 2A and 2B show exemplary components of network portion 200, in other implementations, network portion 200 may include fewer components, different components, differently-arranged components, or additional components than depicted in FIGS. 2A and 2B. Additionally, or alternatively, one or more components of network portion 200 may perform functions described as being performed by one or more other components of network portion 200. Also, in other implementations, variations in signaling or traffic flows may be used to implement the MEC traffic breakout service.

Figure 3A:
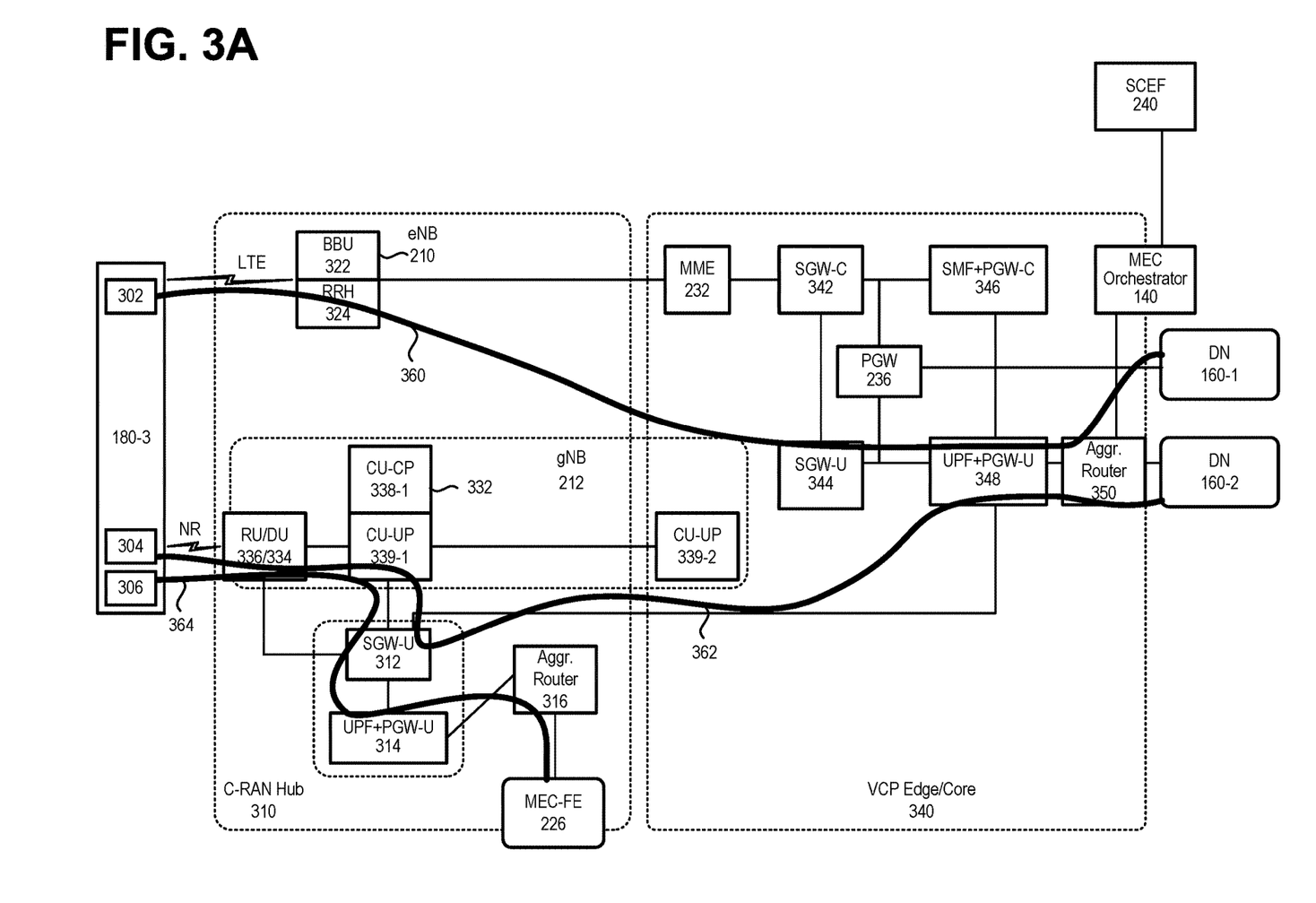
FIGS. 3A and 3B are block diagrams illustrating exemplary network components in a portion of network environment of FIG. 1.
Figure 3B:
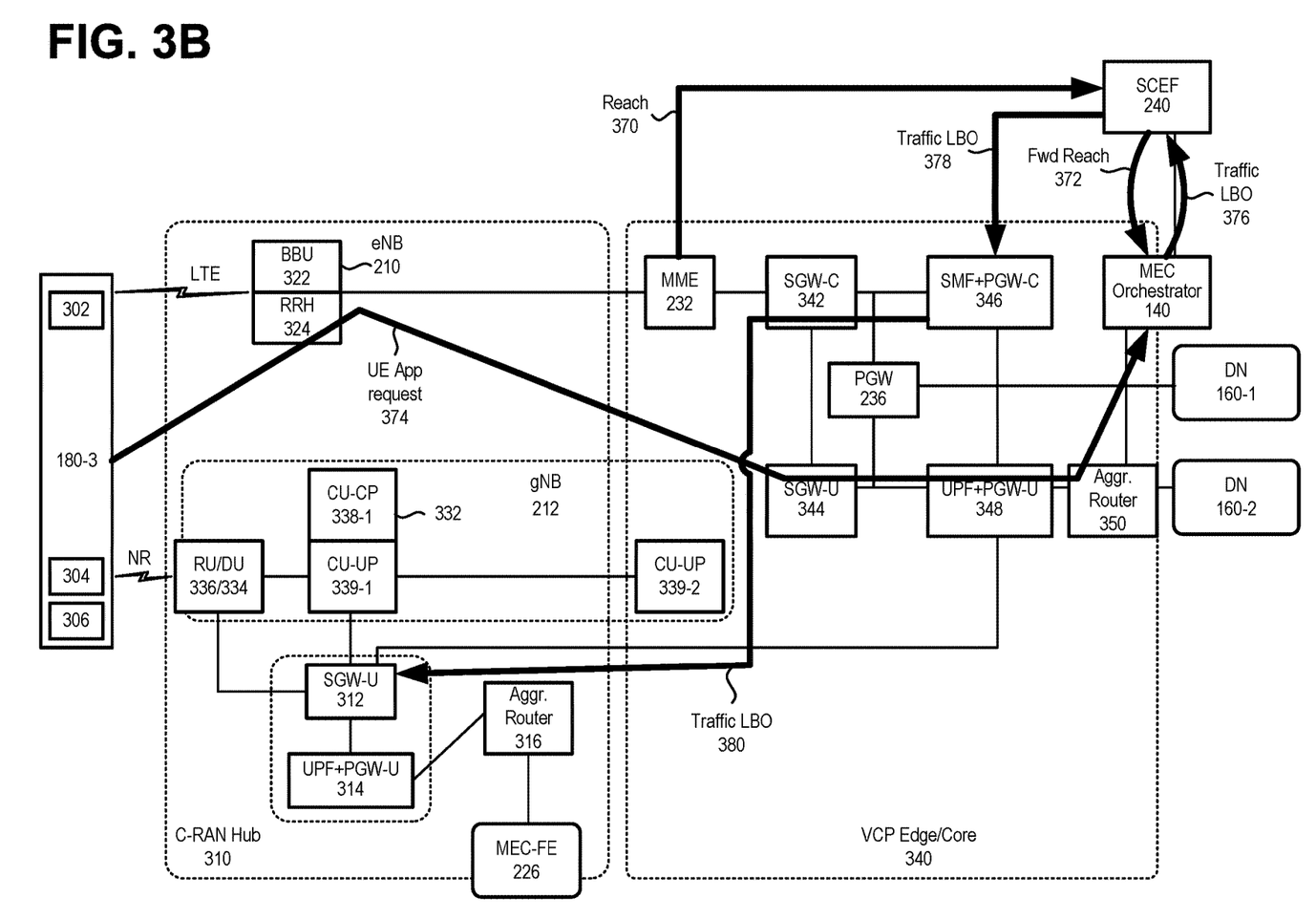

FIGS. 3A and 3B are block diagrams illustrating exemplary network components in a portion 300 of network environment of FIG. 1. More particularly, FIGS. 3A and 3B represent the MEC traffic breakout service with SCEF-controlled LBO at a centralized-RAN (C-RAN) for MEC traffic in an Option 3X-enabled network that has control/user plane separation.

Referring collectively to FIGS. 3A and 3B, network portion 300 may include a C-RAN 310; a virtualized controller platform (VCP) Edge/Core 340; SCEF 240; MEC orchestrator 140; DNs 160-1 and 160-2; and UE device 180-3.

UE device 180-3 may represent a UE device with Evolved Universal Terrestrial Radio Access New Radio Dual Connectivity (EN-DC) capabilities. In the configuration of FIGS. 3A and 3B, UE device 180-3 may host applications with different service requirements. For example, an application 302 may use an LTE connection for initial configuration and/or service continuity, an application 304 may use a NR connection for high speed internet connections, and an application 306 may include a subscription for MEC services to support ultra-low latency communications.

C-RAN hub 310 may connect to VCP/core 340 and MEC-FE 226 to facilitate routing for the MEC traffic breakout service. C-RAN 310 may include one or more eNBs 210 and one or more gNBs 212, each of which may correspond to a wireless station 110. eNB 310 may include at least one base-band unit (BBU) 322 and multiple remote radio heads (RRHs) 324 for providing a radio communication interface to UE devices 180 that subscribe to LTE wireless network service.

gNB 212 may include a New Radio (NR) Next Generation gNodeB used in a 5G mobile network (e.g., for access network 105). gNB 212 may include a centralized unit (CU) 332, at least one distributed unit (DU) 334, and at least one radio unit (RU) 336. CU 332 controls the transport of data (e.g., data packets) received at a RU 336 via wireless RF transmissions from UE device 180 and controls the transport of data from the wireless network to DU 334 and RU 336 for wireless transmission to a destination UE device 180. As shown, CU 332 may be divided into two subcomponents: a CU-Control Plane (CP) component 338 (referred to herein as "CU-CP 338") and a CU-User Plane (UP) component 339 (referred to herein as "CU-UP 339"). The CU-CP 338 includes a logical node that hosts Radio Resource Control (RRC), and other control plane, functions (e.g., Service Data Adaptation Protocol (SDAP), and Packet Data Convergence Protocol (PDCP)). In some implementations, the CU-CP 338 may additionally host a radio slice controller. The radio slice controller may select a particular DU 334 and a particular CU-UP 339 for routing and transporting data to and from a UE device 180 for a given data session based on, for example, a performance profile associated with the DU 334, a user profile associated with the UE, and/or network performance requirements associated with the network service, application, or traffic involved in the data session.

The CU-UP 339 includes a logical node that hosts user plane functions, such as, for example, data routing and transport functions. CU-CP 338 and CU-UP 339 of CU 332 may include distributed nodes that may be located remotely from one another. Multiple distributed CU-CPs 338 and/or multiple CU-UPs 339 may be positioned at different locations within a network. A selected one of the CU-CPs 332 and a selected one of the CU-UPs 339 may be used for handling traffic from one or more UE devices 180.

According to an implementation, C-RAN hub 340 may also include a SGW-U 312, a UPF+PGW-U 314, and an aggregation router 316. SGW-U 312 may include local network device that interfaces with gNB 212 for user plane communications. UPF+PGW-U 314 may include a network device (e.g., a converged node) that provides UPF functionality for 5G network access and user plane functionality for 4G network access. Aggregation router 316 may route, for example, traffic from UE devices 180 to VCP/edge core 340 or MEC-FE 226.

VCP/core 340 includes the core components of a combined 5G/4G wireless network that serves to provide wireless access to subscribing UE devices 180. Components of VCP/core 340 may be included in core network 150 (e.g., network devices 155) or included in a centralized portion of MEC network 130 (e.g., MEC devices 135). The wireless network may include any type of wireless network that provides wireless access and connectivity to UE devices 180. The wireless network may include, for example, a PLMN or a satellite network. In the case of a 5G wireless network that also supports 4G connections, the core components may include, among other components, MME 232, PGW 236, CU-CP 339-2, SGW-C 342, SGW-U 344, SMF+PGW-C 346, a core-implemented UPF+PGW-U 348, and an aggregation router 350.

MME 232, PGW 236, and CU-CP 339-2 may perform control plane and/or user plane functions as described above. MEC orchestrator 140, data networks 160, and SCEF 240 may perform functions similar to those described above and as described further herein. SGW-C 342 includes a network device that provides separate SGW control plane functionality. SGW-U 344 includes a network device that provides separate SGW user plane functionality. Aggregation router 350 may route, for example, traffic from UE devices 180 to a MEC orchestrator 140 or DN 160.

SMF+PGW-C 346 may include a network device (e.g., a converged node) that provides SMF functionality for 5G and PGW control plane functionality for 4G. Thus, in one implementation, SMF+PGW-C 220 may be treated as a single network entity that provides/retrieves information for both 4G and 5G core network functions.

UPF+PGW-U 348 may include a network device (e.g., a converged node) that provides UPF functionality for 5G and user plane functionality for 4G. UPF+PGW-U 348 may maintain an anchor point for intra/inter-RAT mobility, maintain an external Packet Data Unit (PDU) point of interconnection to a data network (e.g., DN 160), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a RAN node (e.g., eNodeB 210), and/or perform other types of user plane processes.

Referring to FIG. 3A, an example of different communication flows for network portion 300 is shown. After initial control plane signaling, UE device 180-3 (e.g., application 302) may be connected to data network 160-1 as illustrated in flow 360. For example, UE device 180-3 (e.g., application 302) may conduct a data session with data network 160-1 via standalone and/or converged LTE components, namely eNB 210, SGW-U 344, and UPF+PGW-U 348.

UE device 180-3 may also be connected to data network 160-2 via a NR connection, as illustrated by flow 362. For example, application 304 of UE device 180-3 may conduct a data session with data network 160-2 using RU/DU 336/334, CU-UP 339-1, SGW-U 312, and UPF+PGW-U 348. Additionally or alternatively, UE 180-3 may connect to MEC-FE 226 for data session with ultra-low latency, as illustrated by flow 364. For example, application 306 of UE device 180-3 may conduct a data session with MEC-FE 226 using RU/DU 336/334, CU-UP 339-1, SGW-U 312, UPF+PGW-U 314, and aggregation router 316.

Thus, in the configuration of FIG. 3A, flows 360 and 362 are anchored on UPF+PGW-U 348 in VCP/core 340. Conversely, flow 362 uses SGW-U 312 to provide local breakout (LBO) for MEC-based traffic. Control plane signaling to configure flows 362/364 is described in connection with FIG. 3B.

Referring to FIG. 3B, MME 232 may provide a reachability notification (reach) 370 to SCEF 240. For example, SCEF 240 may subscribe to receive attachment and mobility information from MME 232. Based, for example, on attachment signaling or a mobility event for UE device 180-3 (not shown), MME 232 may provide reachability notification 370 in the form of a reachability report, which delivers a UE device's current reachability data and notifies of any changes. According to an implementation, reachability notification 370 may include a UE identifier (ID) for UE device 180-3, a current APN, a cell identifier (CID), and an anchor PGW identifier (e.g., for UPF+PGW-U 348). In one implementation, MME 232 may communicate with SCEF 240 via a modified T6a interface relative to a standardized LTE T6a interface.

SCEF 240 may receive reachability notification 370 and forward a reachability notification 372 to MEC orchestrator 140. According to an implementation, SCEF 240 may receive reachability notification 370 and forward reachability notification 372 in real time or near-real time. Reachability notification 372 may include the UE ID for UE device 180-3, the current APN, and location information based on information from reachability notification 370). According to an implementation, MEC orchestrator 140 may store information from reachability notification 372, along with previously-stored MEC network topology.

MEC orchestrator 140 may receive a UE application request 374 initiated by UE device 180-3. For example, UE application request 374 may be received after or concurrently with reachability notification 372. The UE application request 374 may include, for example, a UE ID, application server information (e.g., a FQDN), and application traffic flow information (e.g., source IP/port, destination IP/port, application identifier, etc.). Upon receiving UE application request 374, MEC orchestrator 140 may confirm that an application (e.g., application 306 executing on UE device 180-3) is authorized to receive MEC services. MEC orchestrator 140 may then use the UE information received from SCEF 240 (e.g., reachability notification 372) and its previously-stored MEC application platform topology information to identify a MEC-FE (e.g., MEC-FE 226) that can provide local service responsive to UE application request 374. MEC orchestrator 140 may, thus, invoke a sequence of new commands to initiate a local breakout for the MEC traffic by sending a traffic LBO message 376. Traffic LBO message 376 may include, for example, the UE ID, the traffic flow ID, the APN, and a network area identifier (e.g., an LDN). In one implementation, traffic LBO message 376 may be provided via an IP interface between MEC orchestrator 140 and SCEF 240.

SCEF 240 may receive traffic LBO message 376 and, in response, may generate and send traffic LBO command 378 to the appropriate SMF-PGW-C (e.g., SMF-PGW-C 346) that is serving as an anchor for UE device 180-3. Traffic LBO command 378 may include the same UE ID, the traffic flow ID, and LDN provided in traffic LBO message 376.

SMF-PGW-C 346 may receive traffic LBO command 378 and forward traffic LBO command 378 as traffic LBO command 380 to the appropriate local SGW-U (e.g., SGW-U 312 in C-RAN Hub 310). SGW-U 312 may interface with SMF-PGW-C 346 through an N4 interface.

SGW-U 312 may receive traffic LBO command 380 and strip off tunneling information. Using the information in traffic LBO command 380, SGW-U 312 may switch the destination IP/port for the MEC-based traffic flow and redirect the flow to MEC-FE 226. Thus, network portion 200 may dynamically establish, for a particular session, MEC communications (e.g., flow 364 of FIG. 3A) between UE device 180-3 (e.g., application 306) and MEC-FE 226, while other NR traffic (e.g., flow 362) may continue to be routed through anchor UPF+PGW-U 348.

Although FIGS. 3A and 3B show exemplary components of network portion 300, in other implementations, network portion 300 may include fewer components, different components, differently-arranged components, or additional components than depicted in FIGS. 3A and 3B. Additionally, or alternatively, one or more components of network portion 300 may perform functions described as being performed by one or more other components of network portion 300. Also, in other implementations, variations in signaling or traffic flows may be used to implement the MEC traffic breakout service. For example, in another implementation, SCEF 240 may maintain MEC edge topology, such that SCEF 240 would manage MEC routing and reachability notification 262/372 and traffic LBO message 266/376 would not exchange location data for UE device 180.

Figure 4:
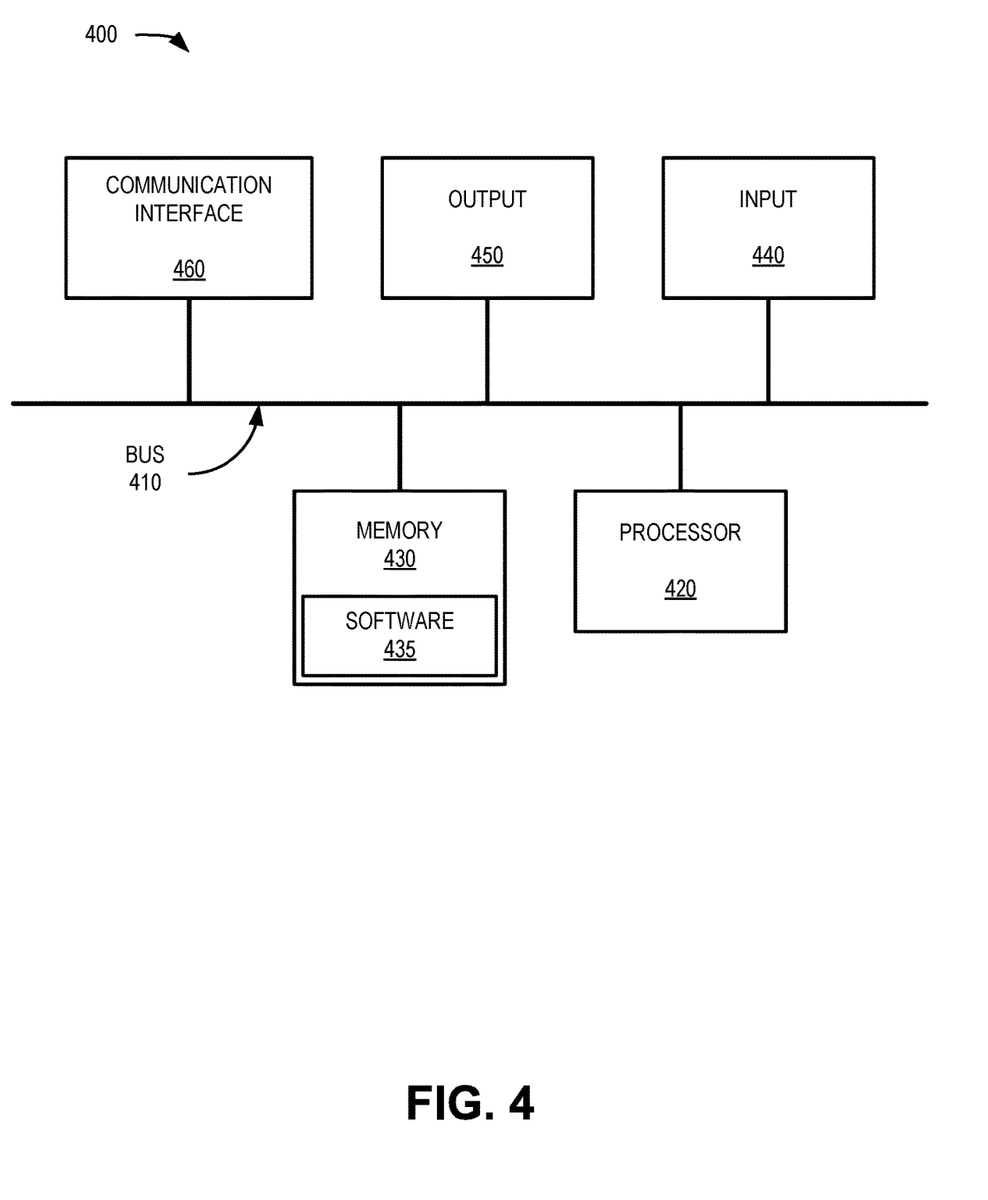
FIG. 4 is a diagram of exemplary components of a device that may be included in the network environment of FIG. 1.

FIG. 4 is a diagram of exemplary components of a device 400. Device 400 may execute functions of wireless station 110 (e.g., including components eNB 210 and gNB 212), MEC device 135, network device 155, network device 165, and UE device 180. Device 400 may additionally execute functions of MEC orchestrator 140, MEC-FE 226, SCEF 240, C-RAN hub 310, and VCP edge/core. As shown in FIG. 4, device 400 may include a bus 410, a processor 420, a memory 430, an input device 440, an output device 450, and a communication interface 460.

Bus 410 may include a path that permits communication among the components of device 400. Processor 420 may include a processor, a microprocessor, an application specific integrated circuit (ASIC), a field programmable gate array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 400 and/or executing programs/instructions. Memory 430 may include any type of dynamic storage device that may store information and instructions, for execution by processor 420, and/or any type of non-volatile storage device that may store information for use by processor 420.

Software 435 includes an application or a program that provides a function and/or a process. Software 435 is also intended to include firmware, middleware, microcode, hardware description language (HDL), and/or other form of instruction. By way of example, when device 400 is a UE device 180, software 435 may include an application that is configured to use MEC services.

Input device 440 may include a mechanism that permits a user to input information to device 400, such as a keyboard, a keypad, a button, a switch, touch screen, etc. Output device 450 may include a mechanism that outputs information to the user, such as a display, a speaker, one or more light emitting diodes (LEDs), etc.

Communication interface 460 may include a transceiver that enables device 400 to communicate with other devices and/or systems via wireless communications, wired communications, or a combination of wireless and wired communications. For example, communication interface 460 may include mechanisms for communicating with another device or system via a network. Communication interface 460 may include an antenna assembly for transmission and/or reception of radio frequency (RF) signals. For example, communication interface 460 may include one or more antennas to transmit and/or receive RF signals over the air. In one implementation, for example, communication interface 460 may communicate with a network and/or devices connected to a network. Alternatively or additionally, communication interface 460 may be a logical component that includes input and output ports, input and output systems, and/or other input and output components that facilitate the transmission of data to other devices.

Device 400 may perform certain operations in response to processor 420 executing software instructions (e.g., software 435) contained in a computer-readable medium, such as memory 430. A computer-readable medium may be defined as a non-transitory memory device. A non-transitory memory device may include memory space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

The configuration of components of device 400 illustrated in FIG. 4 is for illustrative purposes only. Other configurations may be implemented. Therefore, device 400 may include additional, fewer and/or different components, arranged in a different configuration, than depicted in FIG. 4.

Figure 5:
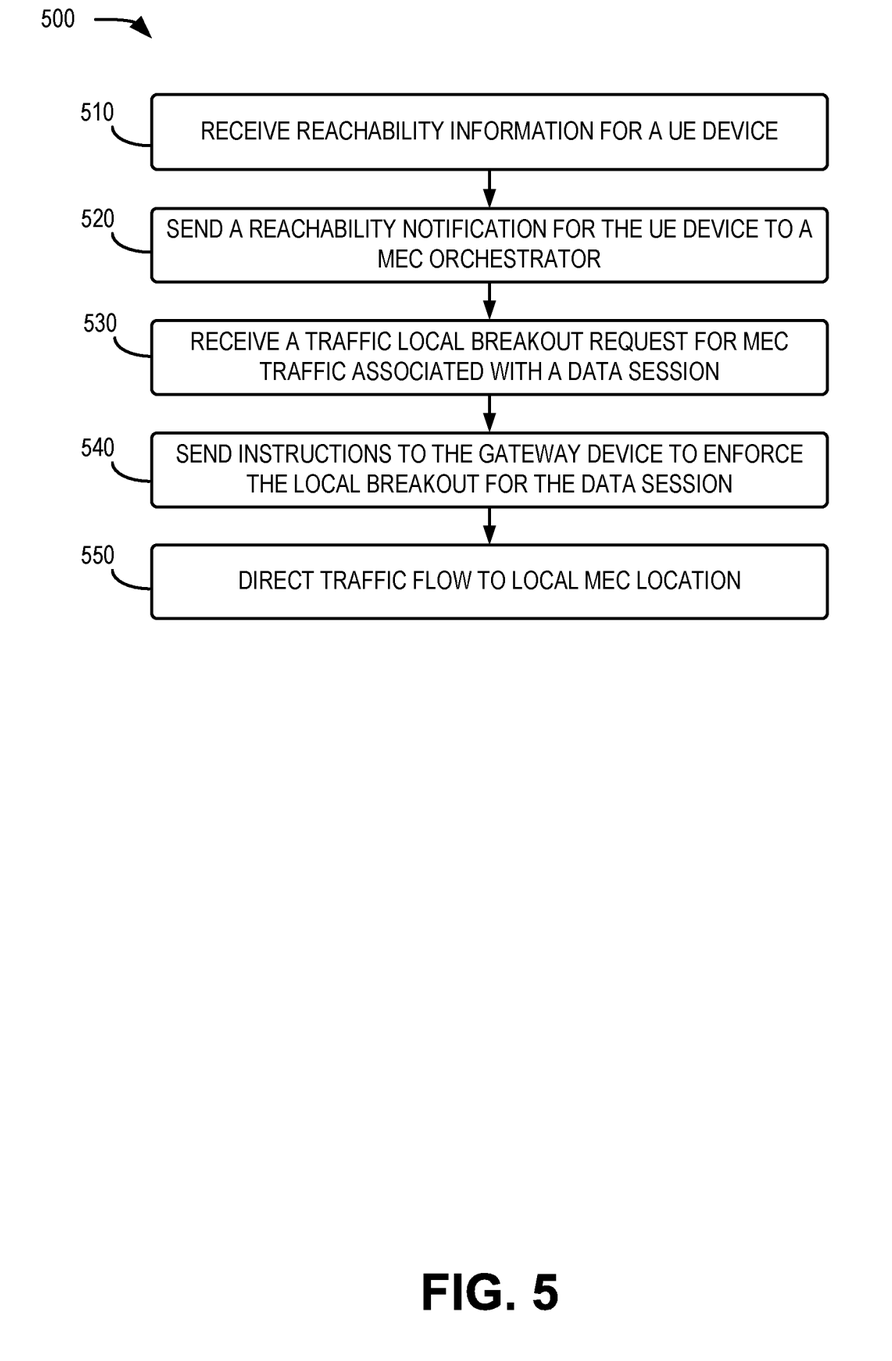
FIG. 5 is a flow diagram illustrating an exemplary process for configuring a MEC traffic breakout service according to an implementation described herein.

FIG. 5 is a flow diagram illustrating an exemplary process 500 for configuring a MEC traffic breakout service for an LTE or non-standalone 5G network. In one implementation, process 500 may be performed by SCEF 240. In another implementation, process 500 may be performed by SCEF 240 in conjunction with one or more other network devices in network environment 100.

Process 500 may include receiving reachability information for a UE device (block 510), and sending a reachability notification for the UE to a MEC orchestrator (block 520). For example, SCEF 240 may receive reachability notification 260 from MME 232 and forward reachability notification 262 to MEC orchestrator 140. Reachability notification 260 may include a UE ID for UE device 180, a current APN, a CID (or another representation of UE location information), and an anchor PGW identifier assigned for the UE. Reachability notification 262 may include the UE ID, the current APN, and location information based on information from reachability notification 260.

Process 500 may further include receiving and evaluating a traffic local breakout request for MEC traffic associated with a data session (block 530). For example, MEC orchestrator 140 may receive a UE application request 264, which cause MEC orchestrator 140 to determine whether a local breakout may be required for MEC traffic associated with a particular application. MEC orchestrator 140 may synthesize information from reachability notification 262, stored MEC network topology data, and optionally traffic loads on MEC-FE 226 to make a LBO decision. Assuming LBO is to be used, MEC orchestrator 140 may forward the decision as LBO message 266. SCEF 240 may receive traffic LBO message 266 from MEC orchestrator 140. Traffic LBO message 266 may include, for example, the UE ID, the traffic flow ID, the APN, and a network area identifier.

Process 500 may also include sending instructions to a gateway device to enforce the local breakout for the data session (block 540). For example, SCEF 240 may generate and send traffic LBO command 268 to the appropriate PGW (e.g., PGW 234, as identified in reachability notification 260) that is serving as an anchor for UE device 180. Traffic LBO command 268 may include the same UE ID, the traffic flow ID, the APN, and LDN provided in traffic LBO message 266. The PGW may receive traffic LBO command 268 and forward traffic LBO command 268 as traffic LBO command 270 to the appropriate local SGW 222 for implementation.

In some implementations, process 500 may include directing a traffic flow to a local MEC location (block 550). For example, in one implementation shown in FIG. 2B, SGW 222-2 may receive traffic LBO command 270 and switch the destination IP/port for the MEC-based traffic flow to redirect the flow to MEC-FE 226-2. In another implementation shown in FIG. 3B, SGW-U 312 may receive traffic LBO command 380 and switch the destination IP/port for the MEC-based traffic flow to redirect the flow to MEC-FE 226.

Systems and methods described herein provide a MEC traffic breakout service for UE devices connection to an LTE or non-standalone 5G network. The systems and methods provide for local breakout of MEC traffic on a per-session basis (e.g., for individual traffic flows), rather than relying on a dedicated MEC APN to support local breakout. Use of dedicated APNs for MEC breakout traffic is undesirable in terms of service flexibility, provisioning and operation and maintenance. By contrast, systems and methods described herein allow a UE device to access a local MEC edge using the same internet APN used for non-MEC traffic.

The systems and methods can be used for both new traffic flow LBO or for modifying existing traffic flow for LBO. Thus, systems and methods described herein effectively address MEC mobility concerns (e.g., UE devices moving across different MEC serving areas) and eliminate the need for DNS lookups to reconnect to a new MEC location during a UE mobility event.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 420, etc.), or a combination of hardware and software (e.g., software 435).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 420) of a device. A non-transitory storage medium includes one or more of the storage mediums described in relation to memory 430.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   receiving, by a network device, reachability information for a user equipment (UE) device;
   sending, by the network device and in response to receiving the reachability information, a reachability notification to a Multi-access Edge Computing (MEC) orchestrator for an edge network;
   receiving, by the network device and from the MEC orchestrator, a local breakout request that identifies a traffic flow authorized for local service from the edge network;
   generating, by the network device, instructions for a gateway device to apply local breakout service, for the traffic flow, to a local MEC application in the edge network; and
   sending, by the network device, the instructions to an anchoring gateway device for the traffic flow.

2. The method of claim 1, wherein sending the instructions includes:
   sending the instructions to an anchor Packet Data Network Gateway (PGW) via a Diameter or Radius-based interface; or
   sending the instructions to a combined session management function (SMF) and PGW-control plane function (SMF+PWG-C) via an application programming interface.

3. The method of claim 1, further comprising:
   receiving the instructions at a serving gateway, and
   redirecting the traffic flow to the local MEC application.

4. The method of claim 3, wherein redirecting the traffic flow comprises:
   switching, by the serving gateway and after receiving the instructions, a destination IP address and port for the traffic flow.

5. The method of claim 1, further comprising:
   forwarding, by the anchoring gateway device, the instructions to a serving gateway for the edge network.

6. The method of claim 1, further comprising:
   associating, by network device, the UE device with an edge location for the edge network, wherein the edge location includes a closest edge location to a wireless station servicing the UE device.

7. The method of claim 1, further comprising:
   associating, by the MEC orchestrator, the UE device with an edge location for the edge network, wherein the edge location includes a closest edge location to a wireless station servicing the UE device.

8. The method of claim 1, wherein the network device includes a Service Capability Exposure Function (SCEF).

9. The method of claim 1, wherein the gateway device is included within one of an Evolved Packet Core (EPC) network or a 5G non-standalone (NSA) core network.

10. The method of claim 1, wherein receiving the reachability information includes one or more of:
    receiving, from a Mobility Management Entity (MME), reachability information related to a network attachment by the UE device, or
    receiving, from the MME, reachability information related to a mobility event by the UE device.

11. A network device, comprising:
    a communications interface;
    a memory to store instructions; and
    one or more processors, coupled to the memory, wherein the one or more processors execute the instructions to:
      receive reachability information for a user equipment (UE) device;
      send, in response to receiving the reachability information, a reachability notification to a Multi-access Edge Computing (MEC) orchestrator for an edge network;

receive, from the MEC orchestrator, a local breakout request that identifies a traffic flow authorized for local service from the edge network;

generate instructions for a gateway device to apply local breakout service, for the traffic flow, to a local MEC application in the edge network; and send the instructions to an anchoring gateway device for the traffic flow.

12. The network device of claim 11, wherein, when sending the instructions, the one or more processors further execute the instructions to:

send the instructions to an anchor Packet Data Network Gateway (PGW) via a Diameter or Radius-based interface; or send the instructions to a combined session management function (SMF) and PGW-control plane function (SMF+PWG-C) via an application programming interface.

13. The network device of claim 11, wherein the one or more processors further execute the instructions to:

forward the instructions to a serving gateway for the edge network.

14. The network device of claim 11, wherein the one or more processors further execute the instructions to:

associate the UE device with an edge location for the edge network, wherein the edge location includes a closest edge location to a wireless station servicing the UE device.

15. The network device of claim 11, wherein the network device includes a Service Capability Exposure Function (SCEF).

16. The network device of claim 11, wherein the network device is included within one of an Evolved Packet Core (EPC) network or a 5G non-standalone (NSA) core network.

17. The network device of claim 11, wherein, when receiving the reachability information, the one or more processors further execute the instructions to:

receive, from a Mobility Management Entity (MME), reachability information related to a mobility event by the UE device.

18. A non-transitory computer-readable storage medium storing instructions executable by a processor of a network device, the instructions comprising:

receiving reachability information for a user equipment (UE) device;

sending and in response to receiving the reachability information, a reachability notification to a Multi-access Edge Computing (MEC) orchestrator for an edge network;

receiving and from the MEC orchestrator, a local breakout request that identifies a traffic flow authorized for local service from the edge network;

generating instructions for a gateway device to apply local breakout service, for the traffic flow, to a local MEC application in the edge network; and sending the instructions to an anchoring gateway device for the traffic flow.

19. The non-transitory computer-readable storage medium of claim 18, the instructions further comprising:

sending the instructions to one of an anchor Packet Data Network Gateway (PGW) or a combined session management function (SMF) and PGW-control plane function (SMF+PWG-C).

20. The non-transitory computer-readable storage medium of claim 18, the sending the instructions to an anchoring gateway device instructions further comprising:

wherein the gateway device is included within one of an Evolved Packet Core (EPC) network or a 5G non-standalone (NSA) core network.

* * * * *